R. E. HEWITT & W. W. WHITMORE.
ROLLER BEARING CURRENT COLLECTOR.
APPLICATION FILED DEC. 23, 1913.
1,158,215.
Patented Oct. 26, 1915.
2 SHEETS—SHEET 1.
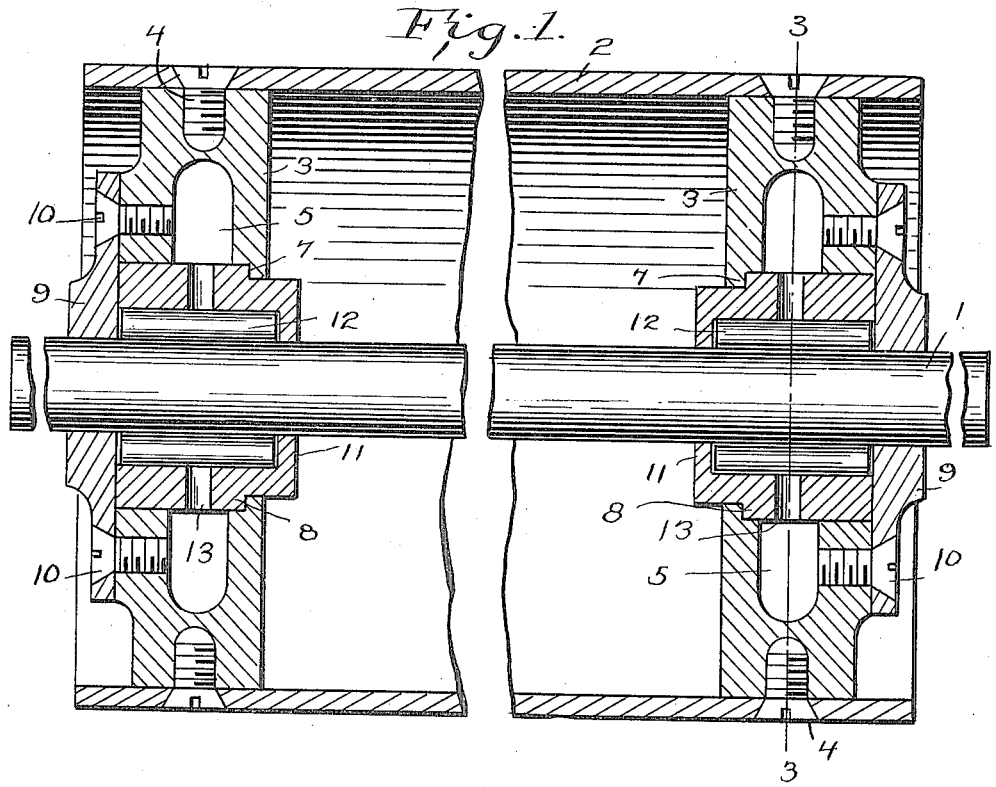
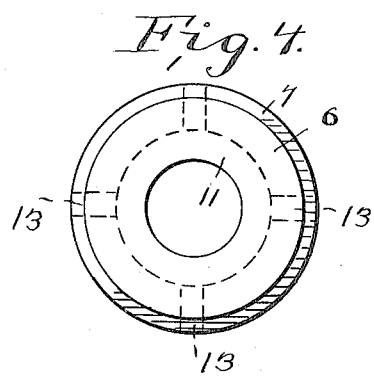

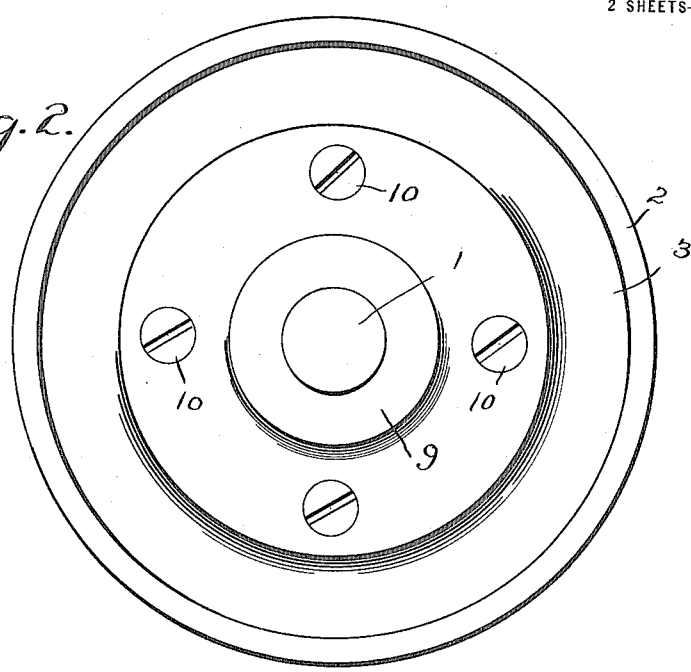
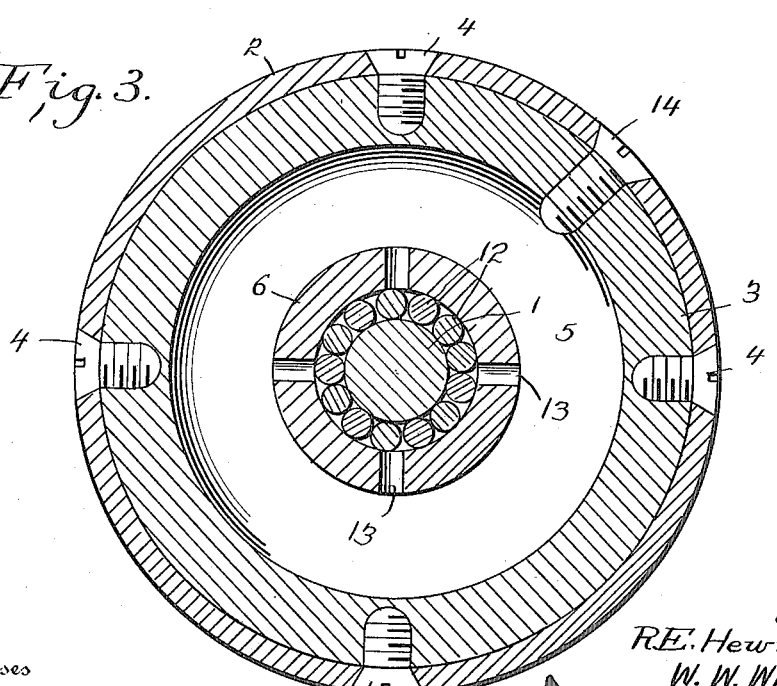

UNITED STATES PATENT OFFICE.

RUDOLPH E. HEWITT, OF ALAMEDA, AND WILLIS W. WHITMORE, OF OAKLAND, CALIFORNIA.

ROLLER-BEARING CURRENT-COLLECTOR.

1,158,215.  Specification of Letters Patent.  Patented Oct. 26, 1915.

Application filed December 23, 1913. Serial No. 808,515.

*To all whom it may concern:*

Be it known that we, RUDOLPH E. HEWITT and WILLIS W. WHITMORE, citizens of the United States, residing at Alameda and Oakland, respectively, in the county of Alameda and State of California, have invented certain new and useful Improvements in Roller-Bearing Current-Collectors; and we do hereby declare the following to be a full, clear, and exact description of the invention, such as will enable others skilled in the art to which it appertains to make and use the same.

This invention relates to roller bearing current collectors, and one of the principal objects of the same is to provide a roller bearing for a current collector which will be provided with means for thorough lubrication of the roller, and which will not require frequent renewals, and which will be constant, uniform and efficient for its purpose.

Another object of the invention is to provide a current collector comprising a hollow shell, having end castings provided with grease pockets, and a bushing for the rollers to bear upon the shaft, said bushings being provided with apertures to feed the oil to the rollers, thus providing a current collector of simple construction, which will hold sufficient oil to lubricate the rollers for a long run.

These and other objects may be attained by means of the construction illustrated in the accompanying drawings, in which, Figure 1 is a longitudinal sectional view of a current collector made in accordance with this invention, Fig. 2 is an end view of the same, Fig. 3 is a sectional view on the line 3—3 of Fig. 1, looking in the direction indicated by the arrows, and Fig. 4 is an end view of the roller bushing.

Referring to the drawings, the numeral 1 designates the shaft. The tubular shell 2 is connected at its end to the castings 3, said castings being inserted in the ends of the shell and connected thereto by means of suitable screws 4. The castings 3 are each provided with an annular oil pocket 5. A soft steel case hardened roller bushing 6 is inserted within the end casting 3 and is provided with a shoulder 8 which bears against a similar shoulder 7 on said end casting. An end cap 9 is secured to the casting 3 by means of suitable screws 10. The bushing 6 is provided with an annular flange 11 which surrounds the shaft 1 and serves to hold the case hardened roller 12 between said flange and the end cap 9. Formed in the bushing 6 are oil holes 13 which communicate with the rolls 12 and lead from the oil pocket 5. As shown in Fig. 3 a screw 14 extends through the shell 2 and through the casting 3, said screw being removable to permit oil to be inserted in the pocket 5.

Upon reference to Fig. 1 it will be seen that the parts already described are duplicated and that they are reversely placed in the opposite end of the shell 2.

From the foregoing it will be obvious that the shell is mounted upon roller bearings which are constantly lubricated and which will develop but little friction.

What is claimed is:—

A current collector comprising a cylindrical shell, castings secured within the ends of said shell, said castings each having an annular oil pocket, bushings secured within said castings and provided with oil holes communicating with said oil pockets, a shaft extending through said bushings, rollers mounted within the bushings centrally in alinement with the oil holes, and bearing on said shafts, an end cap for holding the rollers in place, said end castings each provided with an oil inlet opening and a closure therefor.

In testimony whereof we affix our signatures in presence of two witnesses.

RUDOLPH E. HEWITT.
    WILLIS W. WHITMORE.

Witnesses:
 THEODORE JULIUS,
 W. F. GARDNER.

Copies of this patent may be obtained for five cents each, by addressing the "Commissioner of Patents, Washington, D. C."